A. E. SCHAEFER.
PROCESS FOR THE RECOVERY OF BROMIN.
APPLICATION FILED DEC. 14, 1911.
1,085,944.
Patented Feb. 3, 1914.
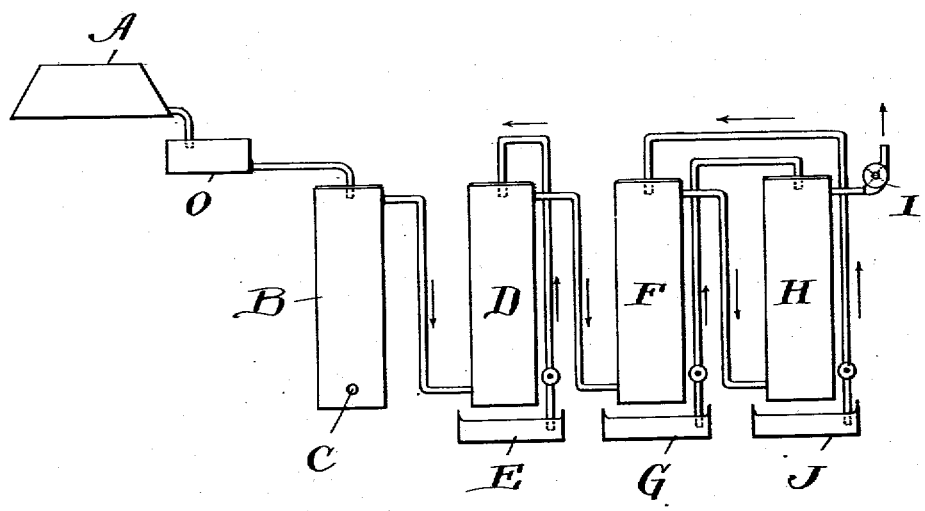

UNITED STATES PATENT OFFICE.

ARTHUR E. SCHAEFER, OF SAGINAW, MICHIGAN.

PROCESS FOR THE RECOVERY OF BROMIN.

1,085,944.  Specification of Letters Patent.  Patented Feb. 3, 1914.

Application filed December 14, 1911. Serial No. 665,626.

*To all whom it may concern:*

Be it known that I, ARTHUR E. SCHAEFER, a citizen of the United States, residing at Saginaw, in the county of Saginaw and State of Michigan, have invented a certain new and useful Improvement in Processes for the Recovery of Bromin, of which the following is a full, clear, and exact description.

In the recovery of bromin from natural brine solutions or other bromin containing solutions, it is customary to treat such solutions in some suitable manner to free the bromin from the chemical combinations in which it may exist in the solution, and then, by passing a stream of air or other inert gas through the solution, obtain a gaseous mixture of the bromin with the gas which is passed through the solution. Various methods have been used for the recovery of bromin from this gaseous mixture and fix it in some chemical form in which it may be available for using in the preparation of alkaline bromids, or other desired products.

My invention relates to a process for the treatment of such bromin laden gases as before described, and the recovery of the bromin therefrom.

Generally speaking, the invention comprises the process defined in the accompanying claims.

Reference should be had to the accompanying drawings, which diagrammatically represent one form of apparatus in connection with which my process may be practised, such disclosed means constituting but one of various ways in which the principle of my invention may be used.

As before stated, the natural brine solution or other bromin containing solution is first treated to free the bromin from its chemical combinations, and this treatment may be electrolysis or by suitable oxidizing agents with or without the use of acid. The treatment of the bromin carrying solution, as just described, liberates bromin, some of which passes off as a gas from the solution, but the greater part remains dissolved in the solution. For the purpose of removing this bromin carried by the solution, it is customary to force air or any other inert gas through the solution, in which manner the bromin is removed from the solution and passes with the air. In order to extract from the solution substantially all of the bromin which is contained in solution therein, it is necessary to pass large quantities of air through the solution, which results in a dilute mixture of air and bromin. It is usual to next pass this gaseous mixture in contact with metallic iron which forms ferric bromid which may be separated from the iron in segregated form. This dilute gaseous mixture is really unfit for the production of bromid of iron by a direct passing of the bromin and air over the metallic iron, for, as is well known, this metallic iron is in finely divided form, or in the form of wire, and the large quantity of air present oxidizes portions of the metallic iron, which results not only in a loss of iron, but what is more important, it causes a coating of iron oxid to form upon the outside of the particles of iron or the iron wire, and in this condition, the bromin is not so thoroughly and intimately brought into contact with the metallic iron. This results in a loss of bromin by some of the bromin failing to unite with the iron, which loss may be more or less great, according to circumstances.

In my process, the air is passed in contact with a solution containing ferrous bromid with or without the admixture of ferric bromid, and, as the bromin and the ferrous bromid come into contact, the ferrous bromid is oxidized to ferric bromid in accordance with the following reaction:

$$2FeBr_2 + Br_2 = 2FeBr_3$$

The bromid may not be entirely removed from the air by the first treatment. Consequently, it is desirable to further treat the same charge of air with another solution of ferrous bromid, and where desirable or necessary, successive treatments of the bromin laden air may be given until the resultant gas is substantially free from bromin.

Very good results are obtained by first passing a solution of ferrous bromid which has previously been used, in contact with the bromin laden air and treating this same air in the succeeding step of the process with a solution of substantially pure ferrous bromid. The affinity between the bromin and the ferrous bromid is such that the first treatment, even with the previously used solution, will remove the greater quantity of bromin from the air, and the subsequent treatment of this air with a strong solution removes practically all of the bromin. The solution which treats the bromin laden air in the first instance is next preferably passed in contact with finely divided iron or iron wire which causes the reduction of the ferric bromid to ferrous bromid. This solution may then be again used for the treatment of the bromin laden air, and this continued treatment of bromin laden air and reduction with iron may be continued until a solution of ferric bromid be obtained which is of the proper and desired strength for such further treatment as it is desired to give the same. Or, if desired, a portion of the ferric bromid solution may be withdrawn, leaving a portion of ferric bromid solution to be diluted with water which, passing into contact with the iron, becomes reduced to ferrous bromid, and may be used for a number of times until it reaches the desired stage of concentration.

Still another method of procedure may be to continually add water to the ferrous bromid solution and draw off ferric bromid solution in a continuous stream after the same has been passed in contact with the bromin laden air a sufficient number of times to produce ferric bromid of the desired concentration.

In carrying out my process, I may use such an apparatus as is diagrammatically represented in the drawing, in which the tank A may represent a tank containing the natural brine or bromin containing solution to be treated.

The brine solution from the tank A passes to the oxidizer O wherein suitable treatment is given in any manner, as heretofore suggested, freeing the bromin from its chemical combination. The solution then is introduced at the top of the tower B, which may be filled with coke or other suitable material, and flows down through the tower to the bottom thereof. Air enters the bottom of the tower through the opening C, and as it ascends through the tower, absorbs the bromin from the solution, passing downwardly through the tower. The solution gathering at the bottom of the tower is conducted away and treated in any desired manner, or if the other desired products, which it may contain, have previously been removed, it may be wasted.

When a brine solution is treated to free the bromin, it usually happens that some chlorin is liberated, so that as the air is passed through the brine solution, it would not only remove the bromin, but such chlorin as had been liberated by the treatment of the original solution. In order to remove whatever chlorin may be present, it is customary to purify the bromin laden air, and this may be accomplished in the well known manner by bringing the mixture of bromin and chlorin gas into contact with a strong solution of some artificial bromid, such as potassium bromid, sodium bromid, etc.,— this step resulting in the formation of potassium chlorid, sodium chlorid, etc., and the freeing of an amount of bromin equivalent to the chlorin removed. Such being the case, the bromin laden air is conducted from the tower B to the bottom of the tower D, which tower is likewise filled with suitable material, such as indicated with respect to the tower B. The gas entering the lower portion of the tower passes toward the top thereof and a solution of suitable artificial bromid, as heretofore suggested, is introduced at the top of the tower and flows toward the bottom thereof. This solution may gather in the receptacle E, and be continually circulated through the tower D until the solution no longer purifies efficiently, at which time it is renewed. The bromin laden air thus purified is led from the top of the tower D to the lower part of the tower F, this tower being filled with suitable material, as heretofore suggested. A solution containing ferrous bromid is introduced at the top of the tower F and flows downwardly through the tower to the receptacle G. During the passage of the bromin laden gas through the tower, the larger proportion of the bromin is removed. The gas with such bromin as may be carried thereby is next introduced at the lower portion of the tower H, which is also filled with suitable material, and passing through this tower is drawn off of the top thereof by the fan I, and is discharged into the atmosphere. Iron bromid solution drawn from the reservoir G is pumped in at the top of the tower H and flows downwardly therethrough, being collected in the reservoir J, and it is from this reservoir that the bromid solution supplied to the tower F is drawn. The reservoir G contains iron in finely divided condition, or in the form of fine wire, and as the iron bromid solution comes from the tower F and passes into contact with the iron within the reservoir G, it is changed by a reduction of the ferric bromid so that substantially all of the solution is ferrous bromid. This solution of comparatively pure ferrous bromid passes through the tower H, through which passes the bromin laden air that is being given its second treatment. We therefore have the conditions in this tower of a strong ferrous bromid solution coming into contact with a gaseous mixture from which the greater part of the bromin has been removed. This strong solution then removes practically all of the bromin, so that the remaining inert gas may pass into the atmosphere. The iron bromid solution, in passing through the tower H, is partly oxidized to ferric bromid, but, by no means entirely so. This solution then is pumped to the tower F, and is used to pass in contact to give the initial treatment to the bromid laden gas.

As will be clear from the foregoing description, the solution flowing from the bottom of the tower F is substantially all iron bromid in the ferric condition, and in this form further treatment may be given the bromid of iron for the purpose of recovering either bromin as such, or the formation of bromids of alkalis or alkaline earths.

The iron bromid may be removed from the lower part of the tower F either continuously, in which event, water or ferrous bromid solution may be continuously added to take the place of the iron bromid removed, or the solution may be removed from time to time, and a fresh solution of ferrous bromid substituted.

Having thus described my invention, what I claim is:

1. The process of recovering bromin from bromin laden gases, which consists in first passing said gases in contact with a solution containing ferrous bromin, then passing the resultant solution in contact with metallic iron, and again passing the solution after treatment with the iron in contact with bromin laden gas.

2. The process of recovering bromin from bromin laden gases, which consists in first passing said gas in contact with a solution containing ferrous bromin, which has previously been passed in contact with bromin laden gas, and subsequently passing the first mentioned bromin laden gas in contact with a solution strong in ferrous bromid.

3. The process of recovering bromin from bromin laden gases which consists in passing a previously used solution containing ferrous bromid in contact with said gases, then passing said solution in contact with metallic iron, and finally passing the said solution in contact with said gases after their first treatment with the first mentioned solution.

4. The process of recovering bromin from bromin laden gases which consists in passing a solution containing ferrous bromid in contact with said gases, then passing the resultant solution in contact with metallic iron, then passing this resultant solution in contact with bromin laden gases and continuing this process in cycle until a solution of desired strength is obtained.

5. The process of recovering bromin from bromin laden gases which consists in passing a solution weak in ferrous bromid in contact with the said gases whereby ferric bromid is formed, then passing said solution in contact with metallic iron, whereby the ferric bromid is reduced to ferrous bromid, then passing the said solution in contact with the bromin laden gases, which have been previously treated.

6. The process of recovering bromin from bromin laden gases which consists in passing said gases through a series of towers, passing a solution containing ferrous bromid through the same towers in a direction opposite to the flow of the bromin laden gases, reducing the resultant solution by passing it in contact with metallic iron, then passing the reduced solution again through the towers in a direction opposite to the flow of the said gases, and continuing this process in cycle until a solution of desired strength is obtained.

In testimony whereof, I hereunto affix my signature in the presence of two witnesses.

ARTHUR E. SCHAEFER.

Witnesses:
H. E. McPhillips,
Geo. C. Ryan.

---

It is hereby certified that in Letters Patent No. 1,085,944, granted February 3, 1914, upon the application of Arthur E. Schaefer, of Saginaw, Michigan, for an improvement in "Processes for the Recovery of Bromin," errors appear in the printed specification requiring correction as follows: Page 1, line 90, for the word "bromid" read *bromin;* page 3, lines 21 and 29, for the word "bromin" read *bromid;* and that the said Letters Patent should be read with these corrections therein that the same may conform to the record of the case in the Patent Office.

Signed and sealed this 3rd day of March, A. D., 1914.

[SEAL.]

J. T. NEWTON,

*Acting Commissioner of Patents.* scription, the solution flowing from the bottom of the tower F is substantially all iron bromid in the ferric condition, and in this form further treatment may be given the bromid of iron for the purpose of recovering either bromin as such, or the formation of bromids of alkalis or alkaline earths.

The iron bromid may be removed from the lower part of the tower F either continuously, in which event, water or ferrous bromid solution may be continuously added to take the place of the iron bromid removed, or the solution may be removed from time to time, and a fresh solution of ferrous bromid substituted.

Having thus described my invention, what I claim is:

1. The process of recovering bromin from bromin laden gases, which consists in first passing said gases in contact with a solution containing ferrous bromin, then passing the resultant solution in contact with metallic iron, and again passing the solution after treatment with the iron in contact with bromin laden gas.

2. The process of recovering bromin from bromin laden gases, which consists in first passing said gas in contact with a solution containing ferrous bromin, which has previously been passed in contact with bromin laden gas, and subsequently passing the first mentioned bromin laden gas in contact with a solution strong in ferrous bromid.

3. The process of recovering bromin from bromin laden gases which consists in passing a previously used solution containing ferrous bromid in contact with said gases, then passing said solution in contact with metallic iron, and finally passing the said solution in contact with said gases after their first treatment with the first mentioned solution.

4. The process of recovering bromin from bromin laden gases which consists in passing a solution containing ferrous bromid in contact with said gases, then passing the resultant solution in contact with metallic iron, then passing this resultant solution in contact with bromin laden gases and continuing this process in cycle until a solution of desired strength is obtained.

5. The process of recovering bromin from bromin laden gases which consists in passing a solution weak in ferrous bromid in contact with the said gases whereby ferric bromid is formed, then passing said solution in contact with metallic iron, whereby the ferric bromid is reduced to ferrous bromid, then passing the said solution in contact with the bromin laden gases, which have been previously treated.

6. The process of recovering bromin from bromin laden gases which consists in passing said gases through a series of towers, passing a solution containing ferrous bromid through the same towers in a direction opposite to the flow of the bromin laden gases, reducing the resultant solution by passing it in contact with metallic iron, then passing the reduced solution again through the towers in a direction opposite to the flow of the said gases, and continuing this process in cycle until a solution of desired strength is obtained.

In testimony whereof, I hereunto affix my signature in the presence of two witnesses.

ARTHUR E. SCHAEFER.

Witnesses:
H. E. McPHILLIPS,
GEO. C. RYAN.

---

It is hereby certified that in Letters Patent No. 1,085,944, granted February 3, 1914, upon the application of Arthur E. Schaefer, of Saginaw, Michigan, for an improvement in "Processes for the Recovery of Bromin," errors appear in the printed specification requiring correction as follows: Page 1, line 90, for the word "bromid" read *bromin;* page 3, lines 21 and 29, for the word "bromin" read *bromid;* and that the said Letters Patent should be read with these corrections therein that the same may conform to the record of the case in the Patent Office.

Signed and sealed this 3rd day of March, A. D., 1914.

[SEAL.]

J. T. NEWTON,

*Acting Commissioner of Patents.*

It is hereby certified that in Letters Patent No. 1,085,944, granted February 3, 1914, upon the application of Arthur E. Schaefer, of Saginaw, Michigan, for an improvement in "Processes for the Recovery of Bromin," errors appear in the printed specification requiring correction as follows: Page 1, line 90, for the word "bromid" read *bromin;* page 3, lines 21 and 29, for the word "bromin" read *bromid;* and that the said Letters Patent should be read with these corrections therein that the same may conform to the record of the case in the Patent Office.

Signed and sealed this 3rd day of March, A. D., 1914.

[SEAL.]

J. T. NEWTON,

*Acting Commissioner of Patents.*